(12) United States Patent
Li et al.

(10) Patent No.: US 12,693,218 B2
(45) Date of Patent: Jul. 28, 2026

(54) SYSTEM AND METHOD FOR OPEN-PATH SENSING OF A FLUID

(71) Applicants: IMEC VZW, Leuven (BE); Universiteit Gent, Ghent (BE)

(72) Inventors: YanLu Li, Kessel-Lo (BE); Roeland Baets, Deinze (BE)

(73) Assignees: IMEC VZW, Leuven (BE); Universiteit Gent, Ghent (BE)

( * ) Notice: Subject to any disclaimer, the term of this patent is extended or adjusted under 35 U.S.C. 154(b) by 94 days.

(21) Appl. No.: 18/766,951

(22) Filed: Jul. 9, 2024

(65) Prior Publication Data

US 2025/0020585 A1 Jan. 16, 2025

(30) Foreign Application Priority Data

Jul. 11, 2023 (EP) ..................................... 23184890

(51) Int. Cl.
*G01N 21/45* (2006.01)
*G01F 1/661* (2022.01)
(Continued)

(52) U.S. Cl.
CPC ............. *G01N 21/45* (2013.01); *G01F 1/661* (2013.01); *G01N 21/85* (2013.01); *G01M 3/04* (2013.01); *G01N 2021/1797* (2013.01)

(58) Field of Classification Search
CPC .. G01N 21/85; G01N 2021/1797; G01M 3/04
See application file for complete search history.

(56) References Cited

U.S. PATENT DOCUMENTS 4,447,153 A 5/1984 Cremeres et al.
10,036,966 B2 * 7/2018 Johnston ............... G03F 9/7049
(Continued)

FOREIGN PATENT DOCUMENTS

CN 103364371 A * 10/2013
KR 101309136 B1 9/2013
(Continued)

OTHER PUBLICATIONS

Owens, Melody Avery, Christopher C. Davis, and Russell R. Dickerson. "A photothermal interferometer for gas-phase ammonia detection." Analytical chemistry 71.7 (1999): 1391-1399 (Year: 1999).*
(Continued)

*Primary Examiner* — Kara E. Geisel
*Assistant Examiner* — Roberto Fabian, Jr.
(74) *Attorney, Agent, or Firm* — MOSER TABOADA

(57) ABSTRACT

A system for open-path sensing of a property of a fluid in an environment comprises: a sensing light source; a pumping light source for outputting a pumping beam into the environment for inducing a change of light propagation characteristics of the fluid; wherein the system outputs a probing beam and a reference beam into the environment, such that the probing beam has a larger intersection with the pumping beam than the reference beam; wherein a first interferometer detects a phase shift and/or an intensity change of a received probing beam; and wherein a second interferometer detects a phase shift and/or an intensity change of a received reference beam.

14 Claims, 5 Drawing Sheets

(51) Int. Cl.
G01M 3/04 (2006.01)
G01N 21/17 (2006.01)
G01N 21/85 (2006.01)

(56) References Cited

U.S. PATENT DOCUMENTS

| | | | |
|---|---|---|---|
| 2008/0198369 A1 | 8/2008 | Sogard | |
| 2009/0046297 A1* | 2/2009 | Sogard | G01N 21/45 |
| | | | 356/498 |
| 2019/0195781 A1 | 6/2019 | Waclawek et al. | |

FOREIGN PATENT DOCUMENTS

| | | | | |
|---|---|---|---|---|
| PL | | 235262 B1 * | 6/2020 | |
| WO | WO-2010087390 A1 * | | 8/2010 | G01B 9/02 |

OTHER PUBLICATIONS

Paone, Nicola, and Gian Marco Revel. "Laser vibration measurements through combustive flows: application to an industrial burner in working conditions." Measurement 28.1 (2000): 21-31 (Year: 2000).*

Sedlacek, Arthur J. "Real-time detection of ambient aerosols using photothermal interferometry: Folded Jamin interferometer." Review of scientific instruments 77.6 (2006) (Year: 2006).*

Waclawek, et al: "Balanced-detection interferometric cavity-assisted photothermal spectroscopy", Optics Express, vol. 27, No. 9, 2019, pp. 12183-12195.

Waclawek, et al: "Balanced-detection interferometric cavity-assisted photothermal spectroscopy employing an all-fiber-coupled probe laser configuration", Optics Express, vol. 29, No. 5, 2021, pp. 7794-7808.

Dudzik, et al: "Solid-state laser intra-cavity photothermal gas sensor", Sensors & Actuators: B. Chemical, 328, 2021, pp. 1-6.

Owens, et al: "A Photothermal Interferometer for Gas-Phase Ammonia Detection", Analytical Chemistry, 71, 1999, pp. 1391-1399.

Krzempek, "A Review of Photothermal Detection Techniques for Gas Sensing Applications", Applied Sciences, 9, 2826, 2019, pp. 1-19.

Sedlacek, "Real-time detection of ambient aerosols using photothermal interferometry: Folded Jamin interferometer", Review of Scientific Instruments, 77, 2006, pp. 064903-1-064903-8.

Paone, et al.: "Laser vibration measurements through combustive flows: application to an industrial burner in working conditions", Measurement 28, 2000, pp. 21-31.

Visser, et al.: "A single-beam photothermal interferometer for in-situ measurements of aerosol light absorption", Atmospheric Measurement Techniques Discussions, 2020, pp. 1-24.

Extended European Search Report for Application No. EP23184890.4 dated Jan. 9, 2024, 12 pages.

* cited by examiner

Distribution of temperature change without airflow in z direction

Distribution of temperature change with airflow in -z direction

SYSTEM AND METHOD FOR OPEN-PATH SENSING OF A FLUID

CROSS-REFERENCE TO RELATED APPLICATION

The present application claims the benefit of and priority to EP patent application Ser. No. 23/184,890.4, filed Jul. 11, 2023, the entire contents of which is incorporated herein by reference.

TECHNICAL FIELD

The present description relates to open-path sensing of a property of a fluid in an environment.

BACKGROUND

Open-path sensing is a commonly used technique for gas detection in various fields, including environmental monitoring, industrial safety, and medical diagnosis. The conventional optical absorption spectroscopy method is one of the most widely used methods for open-path sensing. In optical absorption spectroscopy, attenuation of light caused by gas absorption is measured for determining presence of target gases and/or for estimating averaged concentration values of the target gases.

However, optical absorption spectroscopy has limited capability of determining the distribution of gases in open space. Knowing the distribution of gases is essential for many applications, such as leakage detection, where the location of the leakages needs to be identified. In many cases, the gas concentration can vary significantly over short distances, which is not captured by conventional optical absorption spectroscopy methods.

Various techniques have been developed to measure gas distribution in open space. One of these techniques is the use of infrared cameras, which can detect the temperature difference caused by gas absorption. However, this method still has limited capability of determining the gas distribution, since it is affected by factors such as background radiation, air turbulence, and atmospheric conditions.

In addition to determining distribution of gases, it may in many applications be of interest to provide determining other parameters, such as temperature, humidity and air flow.

Thus, there is a need for improved effective gas sensing and detection techniques for providing information on gas properties, such as gas distribution in an open space.

SUMMARY

It is an objective of the present description to solve, or at least mitigate, the above problems. In other words, an objective of the present description is to provide a sensing technique that enables spatially resolved measurement of one or more properties of a fluid. A particular objective of the present description may be to enable determining distribution of a fluid. Another particular objective of the present description is to provide a sensing technique that may be used for determining a plurality of properties of a fluid.

These and other objectives are at least partly met by the invention as defined in the independent claims. Preferred embodiments are set out in the dependent claims.

According to a first aspect, there is provided a system for open-path sensing of a property of a fluid in an environment, the system comprising: at least one sensing light source configured to generate probing beam light and reference beam light; a pumping light source configured to generate and output a pumping beam into the environment, wherein the pumping beam is configured to induce a change of light propagation characteristics of the fluid; a first interferometer; and a second interferometer. The system is configured to output a probing beam into the environment based on a first portion of the probing beam light, to output a reference beam into the environment based on a first portion of the reference beam light, and to output the pumping beam, such that the probing beam and the pumping beam intersect in a sensing region within the environment, and such that a first intersection between the probing beam and the pumping beam is larger than a second intersection between the reference beam and the pumping beam. The first interferometer is configured to receive the probing beam having propagated through the environment, wherein the probing beam is configured to be phase shifted and/or experience an intensity change by propagating through the environment including the sensing region having changed light propagation characteristics induced by the pumping beam, wherein the first interferometer is further configured to detect a phase shift and/or an intensity change of the received probing beam based on interference between the received probing beam and a second portion of the probing beam light which has not propagated through the environment. The second interferometer is configured to receive the reference beam having propagated through the environment, wherein the reference beam is configured to be phase shifted and/or experience an intensity change by propagating through the environment, wherein the second interferometer is further configured to detect a phase shift and/or an intensity change of the received reference beam based on interference between the received reference beam and a second portion of the reference beam light which has not propagated through the environment.

Hereby, an improved system for open-path sensing of a property of a fluid in an environment is provided.

The fluid may be a gas. It should be realized that even though reference is mainly made below to the fluid being a gas, the fluid may alternatively be a liquid and the system may thus be used for sensing a property of the liquid.

The system may be used for determining a property of a target fluid in the environment. Thus, the system may be used for determining presence of the target fluid and the system may further be used for determining a property of the target fluid, such as a distribution of the target fluid in the environment, or determining temperature, humidity, and/or air flow of the target fluid. For instance, the target fluid may be hydrogen and/or carbon dioxide. However, it should be realized that the system may be used for sensing a property of many other fluids depending on the application.

The use of the reference beam may be particularly advantageous in allowing determining of air flow of the target fluid, such as direction and rate of air flow, and in determining distribution of the target fluid.

The pumping beam may be a pumping beam for inducing a photothermal effect. The pumping beam may be configured to be absorbed by the fluid being sensed, such as a target fluid. For instance, the pumping beam may have a wavelength that is specifically absorbed by the fluid.

The fluid may be illuminated by the pumping beam and light of the pumping beam may thus be absorbed by the fluid. Thereby, an increased temperature of the fluid may be obtained and/or the refractive index of the fluid may be changed. In other words, the pumping beam may introduce a photothermal effect in the fluid.

The pumping beam may be a collimated pumping beam. The pumping beam may be a focused pumping beam. Thereby, the heat distribution, i.e. temperature distribution, and/or refractive index of the fluid along the path of the pumping beam may be changed.

The pumping beam may be a pumping beam for inducing a photoacoustic effect. The pumping beam may be configured to generate a photoacoustic signal. Hereby, a photoacoustic effect may be induced in the fluid. In other words, the pumping beam may induce acoustic waves within the fluid. The acoustic waves may cause a change in the refractive index of the fluid. Phrased differently, the photoacoustic effect may change the refractive index of the fluid.

The probing beam may be a sensing beam. The probing beam may be configured to sense and/or detect the fluid in the environment. The probing beam may experience a change in intensity due to deflection caused by a temperature gradient in the fluid. The probing beam may also, or alternatively, experience a phase shift due to a change in refractive index of the fluid.

The probing beam and the pumping beam may intersect in at least one region. The probing beam and the pumping beam may be configured to take the same, substantially the same, or different paths through the environment. The probing beam may have a larger or smaller cross-section than the pumping beam. If the probing beam and the pumping beam take different paths through the environment, the probing beam and the pumping beam may be angled in relation to each other such that the probing beam and the pumping beam intersect in at least one region.

The open-path sensing system may utilize a photothermal effect for sensing a property of the fluid. The pumping beam may be absorbed by the fluid in order to cause the fluid to be heated. The increased temperature of the fluid may in turn change light propagation characteristics of the fluid, such as a refractive index, which may be sensed by the probing beam. However, it should be realized that the pumping beam may induce a change of light propagation characteristics of the fluid in another manner. The pumping beam may for instance cause a change of absorption, saturable absorption, and/or scattering properties of the fluid, which may affect propagation of the probing beam in the fluid.

The probing beam is configured to propagate through at least a portion of the fluid which is affected by the pumping beam. The probing beam may thus experience a phase shift and/or intensity change when propagating through the environment, wherein the phase shift and/or intensity change is in dependence of the fluid being affected by the pumping beam.

The first interferometer is configured to combine a first portion of probing beam light which has propagated through the environment and a second portion of the probing beam light which has not propagated through the environment. The first interferometer may thus determine a change in phase shift and/or intensity of the first portion of the probing beam light caused by the fluid being affected by the pumping beam.

The system is further configured to output a reference beam. The probing beam and the reference beam are configured to have different intersections with the pumping beam, with the intersection between the reference beam and the pumping beam being smaller than the intersection between the probing beam and the pumping beam. For example, the reference beam may not intersect at all with the pumping beam. This implies that the reference beam will not be affected by the change of light propagation characteristics of the fluid by the pumping beam, or the reference beam will at least to a lesser extent than the probing beam be affected by the change of the light propagation characteristics of the fluid. The reference beam will however be propagated through the same environment as the probing beam. This implies that the reference beam and the probing beam may be affected by a common background, such as vibrations affecting optical components and/or common background temperature changes in the environment.

Like the first interferometer, the second interferometer is configured to combine a first portion of reference beam light which has propagated through the environment and a second portion of the reference beam light which has not propagated through the environment. The second interferometer may thus determine a change in phase shift and/or intensity of the first portion of the reference beam light caused by the any background changes in the environment. Hence, output from the second interferometer may be used for removing background noise from measurements performed by the first interferometer. Each interferometer may comprise a photoelectric circuit.

The phase shift and/or intensity change experienced by the probing beam and reference beam may be detected in each interferometer using homodyne and/or heterodyne detection methods. The phases of the probing beam and the reference beam may be retrieved in a time domain. In absence of a pumping beam, the phase changes of the probing beam and the reference beam, in the same time domain, may be the same or substantially the same.

The probing beam light and the reference beam light may have a common wavelength. This ensures that the probing beam light and the reference beam light experience the same effect of any background changes. In addition, the probing beam light and the reference beam light may be formed by a common sensing light source. This implies that light generated in a single sensing light source may be split for forming probing beam light and reference beam light. This implies that any noise in light generated by the sensing light source will be common to the probing beam and the reference beam. Hence, output from the second interferometer may be used for removing common noise originating from the sensing light source (such as laser phase noise) from measurements performed by the first interferometer.

The system uses separate interferometers for determining phase shift and/or intensity change experienced by the probing beam and the reference beam, respectively. This implies that the determination of background information is completely separate from the determination of information of the property of the fluid by the probing beam. This implies that the system allows for easy scaling such that additional probing beams and/or reference beams may be used.

The reference beam and the probing beam may be configured to take similar, such as substantially the same, paths through the environment. The reference beam and the probing beam may propagate in paths adjacent to each other in the environment. For instance, the reference beam and the probing beam may propagate in parallel paths through the environment. However, it should be realized that the reference beam and the probing beam may propagate in different paths through the environment, with the intersection of the reference beam and the pumping beam being smaller than the intersection of the probing beam and the pumping beam.

The probing beam and the reference beam may be in close proximity to each other in at least one region such that the probing beam and the reference beam may experience the same phase change and/or intensity change caused by the environment and/or the fluid. The probing beam and the reference beam may, e.g., experience the same background temperature variations such that the change of the effective refractive index of the fluid may cause the same phase change of the probing beam and the reference beam.

The reference beam has a smaller intersection with the pumping beam than the intersection between the probing beam and the pumping beam. This implies that a volume of the intersection between the reference beam and the pumping beam is smaller than a volume of the intersection between the probing beam and the pumping beam. This may also imply that in any cross-section of the beams in the environment, the intersection between the reference beam and the pumping beam is smaller than the intersection between the probing beam and the pumping beam. For instance, the reference beam and the pumping beam may have no intersection.

The reference beam and the pumping beam may be configured to take similar, such as substantially the same, or different paths through the environment. The reference beam may for instance be parallel with the pumping beam but may be slightly shifted to the pumping beam such that a small or no overlap between the cross-sections of the reference beam and the pumping beam may be provided. The reference beam may have a larger or smaller cross-section than the pumping beam. The reference beam and the pumping beam may be angled in relation to each other and may propagate through the environment so as to form no intersection or a smaller intersection than the intersection between the probing beam and the pumping beam.

The first and second interferometers may be arranged in close relation to a position at which the probing beam and the reference beam, respectively, is output into the environment. The system may comprise a reflective surface, such that the probing beam and the reference beam may propagate through the environment and may be reflected back through the environment to be received by the first and second interferometers, respectively. However, it should be realized that the probing beam and the reference beam may alternatively only pass once through the environment. The first and second interferometers may be arranged such that light is output and detected on opposite sides of the environment in which the property of the fluid is sensed. For example, the second portion of the probing beam light may be propagated through a waveguide from a position at which the probing beam is output to the first interferometer so as not to be propagated through the open space of the environment. Similarly, the second portion of the reference beam light may be propagated through a waveguide from a position at which the reference beam is output to the second interferometer so as not to be propagated through the open space of the environment The system being configured to perform open-path sensing implies that the probing beam, reference beam and pumping beam are output for free-space propagation in the environment. The environment may be a large space corresponding to an indoor or outdoor environment that may or may not define a confined space.

The system may measure the concentration of fluids remotely. The system may realize distribution measurements. The system may measure fluid concentrations in a short measurement time.

Any benefit or technical effect discussed in relation to the first aspect, and any embodiments thereof, may be applicable to any other aspect.

The second interferometer of the system may be configured to determine information allowing reduction of common noise and background of the environment of information acquired by the first interferometer.

The background of the environment may be temperature changes and/or temperature fluctuations in the environment. The reference beam of the second interferometer may be used to monitor changes in the environment.

The noise may be reduced or removed after demodulation of the first and/or second interferometer. The demodulation may be a process including mixing the received probing beam with the second portion of the probing beam light of the first interferometer, thereby forming a first mixed signal, sending the first mixed signal to a photodiode and thereafter to an amplifier to convert the first mixed signal into a first voltage signal, and realize a first phase recovery using digital signal processing or an analog demodulator. Similarly, the received reference beam may be mixed with the second portion of the reference beam light of the second interferometer, thereby forming a second mixed signal, sending the second mixed signal to a photodiode and thereafter to an amplifier to convert the second mixed signal into a second voltage signal, and realize a second phase recovery using digital signal processing and/or an analog demodulator.

In other words, a demodulated signal of the probing beam may be retrieved first, and then the noise may be removed using the reference beam in an electronic domain.

In other words, the demodulation may be a process comprising mixing a received beam with a local beam (first portion of probing beam light or reference beam light) of each interferometer, thereby forming mixed signals, sending the mixed signals to a photodiode, thereby forming photocurrent signals, sending the photocurrent signals to an amplifier such as a photoelectric circuit, an transimpedance amplifier, and/or an integrating amplifier, thereby converting the photocurrent signals into voltage signals, and therefrom realize a phase recovery by using digital signal processing and/or an analog demodulator.

Alternatively, the mixed signal may be sent or directed to a photoelectric circuit. The photoelectric circuit may comprise a photodetector, such as a photodiode or photomultiplier tube, and an amplifier or signal processing circuit configured to convert the photodetector's output into a voltage signal representing characteristics of the beam received by the interferometer. The photoelectric circuit may further comprise filters, amplifiers, and/or other components configured to improve a signal-to-noise ratio of the system.

The voltage signal from the photoelectric circuit may be analyzed to extract information such as a phase change and/or a refractive index change being measured.

The demodulation may be realized by using a homodyne and/or a heterodyne demodulation method.

The pumping beam may be a modulated pumping beam. The modulated pumping beam may induce a variation in the effective refractive index of the fluid at a frequency equal to a modulation frequency of the modulated pumping beam. In other words, the modulated pumping beam may excite the fluid such that the fluid may experience a variation in its effective refractive index at the same modulation frequency as the modulated pumping beam. The modulation of the effective refractive index of the fluid may be used to probe the fluid's optical properties, such as the fluid's concentration, absorption, fluorescence, and/or scattering properties, leading to a modulation of the scattered light intensity and/or phase.

The modulated pumping beam may provide a modulated signal. A modulated signal may enable a property of the fluid to be determined with a better signal-to-noise ratio than enabled by a non-modulated signal. This is due to the modulated signal enabling the property of the fluid to be superposed on a modulation frequency, thus reducing the effect of noise on the signal detected by the first interferometer.

The at least one sensing light source may be a single sensing light source configured to generate light forming both the probing beam light and the reference beam light. In other words, the reference beam may originate from the same sensing light source as the probing beam, such that the reference beam and probing beam may share the same laser noise, e.g., laser specific characteristics, variations, and/or beam phase drifting. Thus, a laser phase noise of the probing beam and the reference beam may be the same. The noise may be measured in the two interferometers, and the noise may be removed from the received beams having propagated through the environment. In comparison, if only a probing beam, or sensing beam, were used, a differentiation between the phase change caused by the laser drift, i.e. noise, and the fluid, may not be possible.

The light generated by the single sensing light source may be split to form the probing beam light and the reference beam light. The light may further be split into more portions of light by each interferometer receiving light from the source and then split the light into a first and second portion of light, the first portion configured to interact with, i.e. propagate through, the environment, and the second portion configured to not interact with, i.e. not propagate through, the environment. The first light portion, having propagated through the environment, may be mixed with the second light portion by the interferometer.

Alternatively, there may be an overall split of the light from the single sensing light source into light interacting with the environment and light not interacting with the environment. The light which is intended to interact with the environment may then be split into a probing beam and a reference beam, whereas the light that does not interact with the environment may be split to be provided to each interferometer for forming the second portion of probe beam light and the second portion of reference beam light, respectively.

The at least one sensing light source may be a plurality of sensing light sources. The plurality of sensing light sources may be phase locked to each other via an optical phase locked loop. This configuration may enable precise control and coordination of the emitted sensing light, and may enhance the performance and reliability of the system. The optical phase locked loop may ensure that the plurality of sensing light sources are synchronized in terms of their optical phase. Further, the system may benefit from redundancy and increased signal strength. The synchronization may enable constructive interference resulting in enhanced signal strength. By coordinating the emission of multiple light sources, the system may generate coherent and amplified signals, leading to improved sensitivity and detection capabilities.

The optical phase locked loop may comprise photodetectors, phase detectors, voltage-controlled oscillators, and feedback circuits to maintain a phase coherence and synchronization of the plurality of sensing light sources. Deviations and/or drifts in the phase of the plurality of sensing light sources may be continuously monitored and corrected to ensure the plurality of sensing light sources remain consistent and phase-locked relative to each other. The phase-locked light sources may improve the accuracy and consistency of the sensing of the fluid as phase variations and/or fluctuations among the plurality of sensing light sources may be minimized, mitigated, or eliminated.

The pumping beam may be configured to have a wavelength corresponding to an absorption wavelength of a substance of interest in the environment. The substance of interest in the environment may be the fluid, such as a specific target fluid. In other words, the pumping beam may be selected to have a wavelength corresponding the absorption wavelength of the fluid. The wavelength of the pumping beam may be easily absorbed by the fluid. Thus, the pumping beam may be absorbed by the fluid, and an illuminated region of the fluid may experience an increase in temperature and a change of the refractive index.

Measurements of different fluids may be performed by selecting a different wavelength of the pumping beam.

The humidity of the sensed fluid may be measured based on an absorption peak of the fluid. The temperature measurement of the sensed fluid may be based on a blue shift of the absorption peak of the fluid as a function of temperature.

To enhance an accuracy of the system, the pumping beam, having propagated through the environment and the fluid, may be received by the system, e.g. by a photoelectric circuit, such that a total absorption of the pumping beam may be estimated. The total absorption of the pumping beam may be estimated by measuring the intensity of the received, reflected, and/or transmitted pumping beam, which may represent a fraction of the pumping beam before it propagated through environment and the fluid. The total absorption of the pumping beam may be used to enhance the accuracy of the system by providing a reference signal accounting for any losses or variations in the optical components between the pumping light source and the fluid. The reference signal may, e.g., be used to normalize the measured signal, and may improve the accuracy of the measurements by compensating for any fluctuations in the system's components or in the environment. Thereby reliability and reproducibility of the measurements may be improved.

The change of light propagation characteristics of the fluid may comprise a change of an effective refractive index of the fluid.

This is an efficient manner of causing a change of light propagation characteristics such that the property of the fluid may be sensed.

The effective refractive index may be detected by the first interferometer and the second interferometer, respectively, based on Laser Doppler Vibrometry. In other words, the effective refractive index of a fluid may be detected by measuring a frequency shift caused by the fluid on the probing beam and/or reference beam. In particular, such frequency shift may be caused by a modulation frequency of the pumping beam.

The environment may be an open space. The open space may be an area or an environment that is not enclosed or at least not affected by walls or other barriers. In other words, the open space may be a space free of physical boundaries limiting movement or access, at least within a volume in which sensing of the property of the fluid is performed. The open space may be an industrial or commercial facility having large open areas such as warehouses or production floors. The open space may be a room. The system for open-path sensing of a property of a fluid in the open space may, e.g., monitor and/or detect the presence, such as a leak, of a fluid in the open space. The system may be configured for open-space sensing of a fluid in the open space.

An angle between a main propagation direction of the probing beam and a main propagation direction of the pumping beam may be smaller than 30°, such as smaller than 10°. In other words, the main propagation direction of the probing beam and a main propagation direction of the pumping beam may be parallel or substantially parallel.

The angle may be mainly constrained by the size of the system. A smaller angle may correspond to a longer and/or a larger sensing region wherein the probing beam and the pumping beam intersect. In other words, the beams may intersect at a smaller angle such that more interaction between the probing beam and the pumping beam may be obtained in the sensing region and in the fluid. Thus, a better signal-to-noise ratio may be obtained. In other words, a smaller angle between the beams may result in a longer intersection length of the beams. Thus, a distance of the probing beam that experience the changed light propagation characteristics of the fluid may be increased such that the detected phase change of the probing beam may be increased.

If the angle is non-zero, i.e. the probing beam and the pumping beam not being parallel and only intersecting in the sensing region, the fluid distribution, temperature distribution, and/or humidity distribution may be measured by scanning a location at which the probing beam and the pumping beam intersect, for example by controlling an output angle of one of the probing beam or the pumping beam.

The system may further comprise a reflective surface configured to reflect the probing beam such that the probing beam having propagated through the environment may be reflected back through the environment to be received by the first interferometer, and to reflect the reference beam such that the reference beam having propagated through the environment may be reflected back through the environment to be received by the second interferometer. The reflective surface may further be configured to reflect the pumping beam such that the pumping beam having propagated through the environment may be reflected back through the environment to be received by the system.

The reflective surface may be mirror, a reflector, and/or a retroreflector. A mirror may be an object with a smooth, polished surface that reflects light in a predictable manner where the angle of incidence is equal to the angle of reflection. A reflector may be any reflective surface or object that redirects light without necessarily preserving the original orientation or arrangement of the incoming light. A retroreflector may be a specific type of reflector that reflects incoming light back in the direction it originated from, regardless of the angle of incidence. The reflective surface may be at least one reflective surface. The reflective surface may be placed such that the pumping, probing, and/or reference beams output into the environment are incident on the reflective surface. The reflective surface may ensure that the beams are reflected back to the system. In other words, the first and/or second interferometer may be configured to, respectively, receive the probing and reference beam having propagated through the environment and having been reflected back by a reflective surface and again propagated through the environment.

In particular, the probing and/or reference beam may have at least one intersection with the reflective surface.

The reference beam may further be used to measure background noise constituted by vibrations of the reflective surface.

The system may further comprise a third interferometer and a fourth interferometer, wherein the system may be further configured to output a second reference beam and a third reference beam into the environment, such that the second reference beam and the third reference beam intersects the pumping beam in a sensing region within the environment, and such that the first intersection between the probing beam and the pumping beam may be larger than a third intersection between the second reference beam and the pumping beam, and such that the first intersection may be larger than a fourth intersection between the third reference beam and the pumping beam; wherein the third interferometer may be configured to receive the second reference beam having propagated through the environment, wherein the second reference beam may be configured to be phase shifted and/or experience an intensity change by propagating through the environment, wherein the third interferometer may be further configured to detect a phase shift and/or an intensity change of the received second reference beam based on interference between the received second reference beam and a portion of the reference beam light which has not propagated through the environment; and wherein the fourth interferometer may be configured to receive the third reference beam having propagated through the environment, wherein the third reference beam may be configured to be phase shifted and/or experience an intensity change by propagating through the environment, wherein the fourth interferometer may be further configured to detect a phase shift of the received third reference beam based on interference between the received third reference beam and a portion of the reference beam light which has not propagated through the environment.

The third and fourth interferometers may generally present the same or corresponding advantages as the first and/or second interferometer. The second and third reference beams may generally present the same or corresponding advantages as the first reference beam.

The use of a plurality of reference beams allows reference information to be provided from different parts of the environment. The reference information may be used in combination such that a distribution of a property of the fluid may be determined and/or flow of the fluid may be determined.

It is understood by a skilled person in the art that any number of interferometers and corresponding probing beams and/or reference beams may be used.

The system may be configured to output the second reference beam and the third reference beam symmetrically positioned around a center of the pumping beam. In other words, the second reference beam and the third reference beam may be symmetrically arranged around at least one center of the pumping beam. The second reference beam and the third reference beam may be symmetrically arranged around the pumping beam in the sensing region and/or in the intersection region of the pumping beam and the probing beam. The second reference beam and third reference beam may be equidistant form a center of the pumping beam. The second and third reference beams may be evenly distributed around the pumping beam and/or the probing beam. This may be particularly useful for allowing a flow, flow distribution, and/or a temperature of the fluid to be measured. Specifically, an effect as a result of the flow on a change of light propagation characteristics as sensed by the second and the third reference beams may be the same such that a calibration relating to asymmetry of the reference beams is not needed. In particular, a change of the property of the fluid may be determined along a line formed between cross-sections of the second and third reference beams in the environment.

The system may be configured to detect a flow rate of the fluid based on measurements by the third interferometer and the fourth interferometer.

If a flow rate of the fluid is non-zero, the part of the fluid excited by the pumping beam will move over time. Consequently, in an intersection of the pumping beam and the fluid, a greater instantaneous effect on the fluid by the pumping beam will be noticed in one end of the pumping beam's cross-section. This differing effect on the fluid, throughout the cross-section of the pumping beam, may be determined based on measurements by the third interferometer and the fourth interferometer. Thus, a flow rate of the fluid may be determined based on differing effects on the fluid within the cross-section of the pumping beam, as sensed by the third and fourth interferometers, wherein each interferometer is a Laser Doppler vibrometer, LDV, such as an LDV photo integrated circuit.

In particular, each LDV may detect and/or analyze a beat frequency. The beat frequency may be the frequency difference between a first light portion having propagated through the environment and a second light portion not having propagated through the environment. The first light portion having propagated through the environment and back to the LDV may have a frequency corresponding to the frequency of the emitted first light portion from the LDV combined with the modulation frequency of the pumping beam light.

If the fluid is moving with a flow rate, a distribution of change of the refractive index due to the pumping beam may be dependent on the flow rate. Thus, the third and fourth interferometers intersecting with different parts of the pumping beam may be affected to different extents by the change in refractive index of the fluid caused by the pumping beam.

Thus, if the fluid is moving with a flow rate, the distribution of variation of refractive index of the fluid in the pumping beam may vary across a cross-section of the pumping beam. Hence, a phase and/or intensity difference between the second reference beam and the third reference beam, as measured by the third interferometer and the fourth interferometer, respectively, may be used to derive the flow rate of the fluid.

The system may be configured to output an additional pumping beam, wherein the additional pumping beam may be configured to induce a change of light propagation characteristics of the fluid, and wherein the pumping beam and the additional pumping beam may be configured to propagate at an angle to each other and to intersect in at least one region of interest in the environment.

In other words, the additional pumping beam may be directed in any direction such that it at least intersects with the probing beam and/or at least some reference beams.

The additional pumping beam may generally present the same or corresponding advantages as the first pumping beam.

The pumping beam and the additional pumping beam (pumping beams) may generate an uneven distribution of a combined intensity of the pumping beams along a main direction of propagation of the pumping beams. This may enable detecting distribution of the property of the fluid, such as flow of the fluid, in a direction along the direction of propagation of the probing beam.

According to a second aspect, there is provided a method for open-path sensing of a property of a fluid in an environment, the method comprising: generating, by at least one sensing light source, probing beam light and reference beam light; outputting, based on a first portion of the probing beam light, a probing beam into the environment; outputting, based on a first portion of the reference beam light, a reference beam into the environment; outputting the pumping beam to induce a change of light propagation characteristics of the fluid, wherein the pumping beam, the probing beam and the reference beam are output such that the probing beam and the pumping beam intersect in a sensing region within the environment, and such that a first intersection between the probing beam and the pumping beam is larger than a second intersection between the reference beam and the pumping beam;

receiving, by a first interferometer, the probing beam having propagated through the environment, wherein the probing beam has phase shifted and/or experienced an intensity change by propagating through the environment including the sensing region in which the light propagation characteristics of the fluid has changed; detecting, by the first interferometer, a phase shift and/or an intensity change of the received probing beam based on interference between the received probing beam and a second portion of the probing beam light which has not propagated through the environment; receiving, by a second interferometer, the reference beam having propagated through the environment, wherein the reference beam has phase shifted and/or experienced an intensity change by propagating through the environment; and detecting, by the second interferometer, a phase shift and/or an intensity change of the received reference beam based on interference between the received reference beam and a second portion of the reference beam light which has not propagated through the environment.

The second interferometer may determine a change in phase shift and/or intensity of the first portion of the reference beam light caused by any background changes in the environment. Hence, output from the second interferometer may be used for removing background noise from measurements performed by the first interferometer.

The second aspect may generally present the same or corresponding advantages as first aspect.

The method may be an open-path measuring method. The method may be a multiple-purpose sensing method for fluids.

The method may comprise heating up the sensing region with the pumping beam.

The method may comprise reflecting, by a reflective surface, the probing beam such that the probing beam having propagated through the environment may be reflected back through the environment to the first interferometer, and reflecting, by the reflective surface, the reference beam such that the reference beam having propagated through the environment may be reflected back through the environment to the second interferometer.

The method may further comprise reflecting, by a reflective surface, the pumping beam such that the pumping beam having propagated through the environment may be reflected back through the environment to the system.

BRIEF DESCRIPTION OF THE DRAWINGS

The above, as well as additional objects, features, and advantages of the present description, will be better understood through the following illustrative and non-limiting detailed description, with reference to the appended drawings. In the drawings like reference numerals will be used for like elements unless stated otherwise.

DETAILED DESCRIPTION

Figures 1A, 1B:
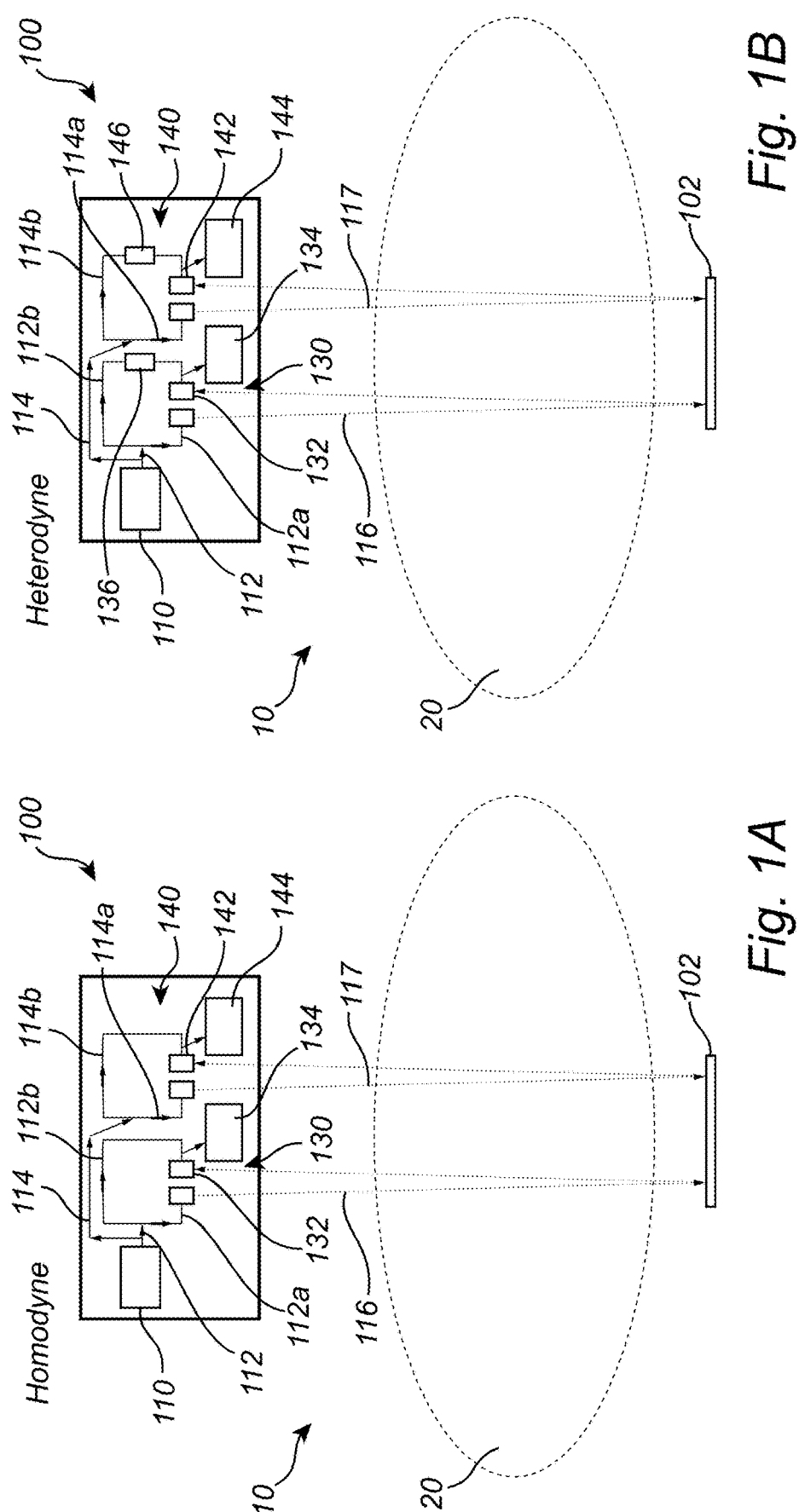
FIG. 1A illustrates a system for open-path sensing of a property of a fluid in an environment with interferometers using a homodyne detection method.
FIG. 1B illustrates a system similar to the system of FIG. 1A with a heterodyne detection method.

FIG. 1A: General FIG. 1A illustrates a system 100 for open-path sensing of a property of a fluid 20 in an environment 10. The environment 10 here constitutes the surroundings of the system 100 in which the fluid 20 is arranged. In other words, the environment 10 is here an open space.

The system 100 comprises a sensing light source 110 for generating sensing light forming both probing beam light 112 and reference beam light 114. In the system 100, a single sensing light source 110 is used for generating both the probing beam light 112 and the reference beam light 114.

Here, the sensing light source 110 is a laser, however, it is appreciated that the sensing light source 110 may be any suitable light source. For instance, the sensing light source may alternatively be formed by a light-emitting diode (LED). It is further to be understood that several, or at least one, light sources may be used. For example, the probing beam light and reference beam light may be generated by separate light sources.

Further, the system 100 comprises a first interferometer 130. The first interferometer 130 is configured to receive probing beam light 112 from the sensing light source 110. The first interferometer 130 is further configured to split the probing beam light 112 into a first portion 112a of the probing beam light and a second portion 112b of the probing beam light. The first interferometer 130 may for instance comprise a beam splitter for splitting the probing beam light 112, but the first interferometer 130 may alternatively use another component for splitting the probing beam light 112 as will be appreciated by the person skilled in the art.

The first interferometer 130 is further configured to output a probing beam 116 into the environment 10 based on the first portion 112a of the probing beam light. The first interferometer 130 may comprise a grating or any other beam diverter for providing output of the probing beam 116.

It should be realized that splitting of the probing beam light 112 into the first and second portion need not necessarily be performed by the first interferometer 130. Thus, the system 100 may comprise another component for splitting probing beam light and providing output of the probing beam.

The first interferometer 130 is further configured to receive the probing beam 116 having propagated through the environment 10. Here, the probing beam 116 is received by an optical antenna 132 of the first interferometer 130. Particularly, the probing beam 116 received by the first interferometer 130 is configured to have been phase shifted and/or experienced an intensity change when propagating through the environment 10.

The probing beam 116 having entered the environment 10 is here reflected back to the first interferometer 130 by a reflective surface 102. In other words, the system 100 further comprises a reflective surface 102 configured to reflect the probing beam 116 such that the probing beam 116 having propagated through the environment 10 is reflected back through the environment 10 to be received by the first interferometer 130. However, the probing beam 116 may alternatively only pass once through the environment 10. In particular, the probing beam 116 having propagated through the environment 10 may be captured into a waveguide after having passed the environment 10 and may then be propagated back to the first interferometer 130 by the waveguide. In other words, the system 100 does not need to comprise a reflective surface 102. Instead, light having propagated through the environment 10 may be received by the first interferometer 130 from a waveguide used for capturing the probing beam 116.

The first interferometer 130 further comprises a mixer for combining the probing beam 116 received in the first interferometer 130 after the probing beam 116 has propagated through the environment 10 and the second portion 112b of the probing beam light 112 which has not propagated through the environment 10. Thus, an interference between the received probing beam 116 and the second portion 112b of the probing beam light 112 may be formed in the first interferometer 130.

The first interferometer 130 further comprises a photodetector 134. The photodetector 134 is configured to detect a signal formed by the mixer, such that the photodetector 134 detects the interference between the received probing beam 116 and the second portion 112b of the probing beam light 112.

The photodetector 134 may thus detect a signal which allows a phase shift and/or an intensity change of the received probing beam 116 to be determined. In other words, the photodetector 134 detect the phase shift and/or the intensity change of the received probing beam 116 based on interference between the received probing beam 116 and the second portion 112b of the probing beam light 112 which has not propagated through the environment 10.

The system 100 further comprises a second interferometer 140. The second interferometer 140 may be constituted in a same manner as described above for the first interferometer 130. Hence, all details of the second interferometer 140 are not discussed herein.

The second interferometer 140 is configured to receive reference beam light 114 from the sensing light source 110 instead of probing beam light 112 received by the first interferometer 130. However, as illustrated in FIG. 1A, light generated by the sensing light source 110 may be split into the probing beam light 112 and the reference beam light 114, such that the reference beam light 114 may be formed from the same light as the probing beam light 112.

Similar to the first interferometer 130, the second interferometer 140 is configured to split the reference beam light 114 into a first portion 114a of the reference beam light and a second portion 114b of the reference beam light. Also, the second interferometer 140 is further configured to output a reference beam 117 into the environment 10 based on the first portion 114a of the reference beam light.

The second interferometer 140 is further configured to receive the reference beam 117 having propagated through the environment 10. Here, the reference beam 117 is received by an optical antenna 142 of the second interferometer 140. The reference beam 117 received by the second interferometer 140 is configured to have been phase shifted and/or experienced an intensity change when propagating through the environment 10.

The reference beam 117 having entered the environment 10 is also here reflected back by the reflective surface 102. The system 100 may comprise a single reflective surface 102 configured to reflect both the probing beam 116 and the reference beam 117. Alternatively, separate reflective surfaces may be provided for reflecting the probing beam 116 and the reference beam 117, respectively. Thus, the system 100 comprises a reflective surface 102 configured to reflect the reference beam 117 such that the reference beam 117 having propagated through the environment is reflected back through the environment 10 to be received by the second interferometer 140. However, as also explained above for the first interferometer 130, the reference beam 117 may alternatively only pass once through the environment 10 and a waveguide may be used instead for guiding light having passed through the environment 10 back to the second interferometer 140.

The second interferometer 140 further comprises a mixer for combining the reference beam received in the second interferometer 140 after the reference beam has propagated through the environment 10 and the second portion 114*b* of the reference beam light which has not propagated through the environment 10. Thus, an interference between the received reference beam and the second portion 114*b* of the reference beam light may be formed in the second interferometer 140.

The second interferometer 140 further comprises a photodetector 144. The photodetector 144 is configured to detect a signal formed by the mixer, such that the photodetector 144 detects the interference between the received reference beam 117 and the second portion 114*b* of the reference beam light 114.

The photodetector 144 of the second interferometer 140 is configured to detect a phase shift and/or an intensity change of the received reference beam 117 based on interference between the received reference beam 117 and a second portion 114*b* of the reference beam light 114 which has not propagated through the environment 10.

Although not shown here, the photodetectors 134, 144 may be part of one or more photoelectric circuits. In particular, the photodetectors 134, 144 may be coupled to each other via an electric domain such that the second interferometer 140 may be configured to determine information allowing reduction of common noise and background of the environment 10 of information acquired by the first interferometer 130.

The detection of the phase shift and/or intensity change experienced ty the probing beam 116 and the reference beam 117, respectively, is performed by a homodyne detection method in the first embodiment shown in FIG. 1A. Thus, there is no controlled shift of frequency of the second portion 112*b* of probing beam light and the second portion 114*b* of reference beam light, respectively, such that light of common frequencies are combined in the first interferometer 130 and the second interferometer 140, respectively, and detected by the photodetectors 134, 144.

In FIG. 1B, the system 100 is illustrated for heterodyne detection instead of homodyne detection. Thus, the system 100 in FIG. 1B may be identical to the system in FIG. 1A, except for being configured to provide heterodyne detection. Thus, as shown in FIG. 1B, the first interferometer 130 may comprise a first optical frequency shifter 136. Also, the second interferometer 140 may comprise a second optical frequency shifter 146. In other words, an optical frequency shifter may be provided in connection with each interferometer. In particular, the first and second optical frequency shifters 136, 146 may be configured to shift the frequency of the second portion 112*b*, of the probing beam light and the second portion 114*b* of the reference 5 beam light, respectively. Thus, a frequency of the second portion 112*b* of the probing beam light may be shifted and a frequency of the second portion 114*b* of the reference beam light may be shifted. This implies that light of different frequencies are combined in the first interferometer 130 and the second interferometer 140, respectively, and detected by the photodetectors 134, 144. Thus, a heterodyne detection method may be used.

Figure 2A:
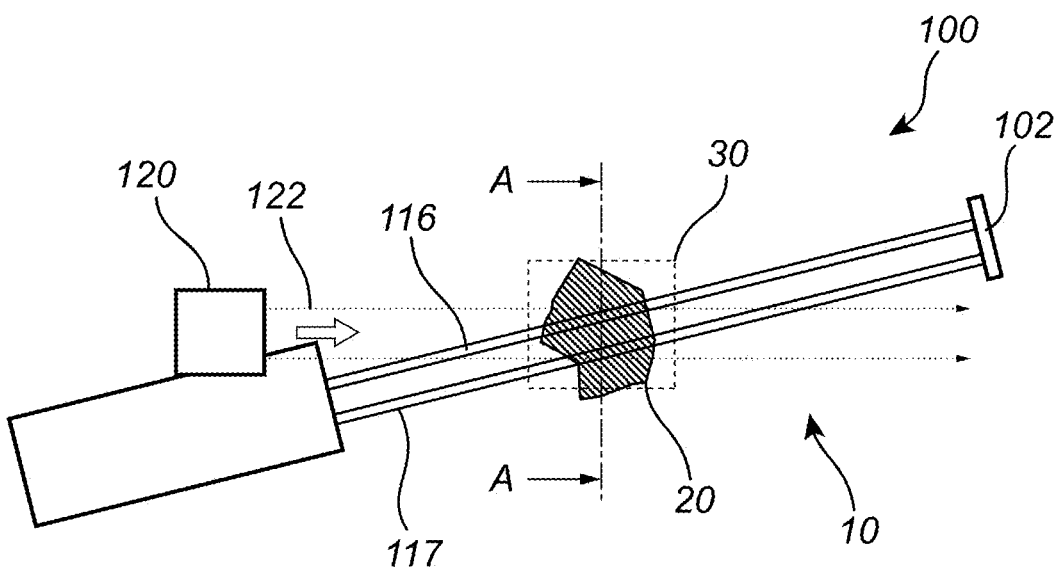
FIG. 2A depicts a schematic setup of the system of FIG. 1A or FIG. 1B for open-path sensing of a property of a fluid in an environment according to a first embodiment.

FIG. 2A shows a schematic setup of the system 100 for open-path sensing of a property of a fluid 20 in an environment 10 according to a first embodiment.

The system 100 comprises the sensing light source 110, the first interferometer 130 and the second interferometer 140 as described above. These details are not shown in FIG. 2A for clarity. The system 100 shown in FIG. 2A may be set up to use the homodyne detection method shown in FIG. 1A or the heterodyne detection method shown in FIG. 1B.

The system 100 further comprises a pumping light source 120. The pumping light source 120 is configured to generate and output a pumping beam 122 into the environment 10. The pumping beam 122 is configured to induce a change of light propagation characteristics of the fluid 20. In particular, the pumping beam 122 may be a modulated pumping beam such that the change of light propagation characteristics of the fluid 20 may comprise a change of the light propagation characteristics of the fluid 20 at a frequency equal to a modulation frequency of the modulated pumping beam.

The pumping beam 122 may be configured to change light propagation characteristics of the fluid 20 so as to affect the propagation of at least the probing beam 116 and possibly also propagation of the reference beam 117 through the fluid 20. For instance, the light propagation characteristics may be changed so as to change absorbance, reflection, or transmittance of the probing beam 116 and possibly the reference beam 117 through the fluid 20. However, the pumping beam 122 may preferably be configured to change an effective refractive index of the fluid 20.

The pumping beam 122 may for instance have a wavelength corresponding to an absorption wavelength of a substance of interest in the environment 10. In other words, the pumping beam 122 may have a wavelength corresponding to an absorption wavelength of the fluid 20 in the environment 10.

The absorption of the pumping beam 122 by the fluid 20 may cause a local heating of the fluid 20. An increase in temperature of the fluid 20 may in turn cause a change in refractive index of the fluid 20. Thus, the pumping beam 122 may be used for causing a change of the effective refractive index of the fluid 20 by the pumping beam 122 being absorbed by the fluid 20.

The system 100 is configured to output the pumping beam 122 such that the probing beam 116 and the pumping beam 122 intersect in a sensing region 30 within the environment 10. In other words, the probing beam 116 is output such that the probing beam 116 and the pumping beam 122 propagate through a common region of the environment 10. In the system 100 shown in FIG. 2A, the probing beam 116 and the pumping beam 122 are not parallel. This implies that the sensing region 30 is limited to a small portion of the environment 10 where the probing beam 116 crosses the pumping beam 122. For example, an angle between a main propagation direction of the probing beam 116 and a main propagation direction of the pumping beam 122 may be smaller than 30°, such as smaller than 10°. The probing beam 116 and/or the pumping beam 122 may be controlled so as to change a position and/or angle of the probing beam 116 and/or the pumping beam 122. This may be used for changing location of the sensing region 30 in the environment 10 such that the environment 10 or at least part of the environment 10 may be scanned.

Figure 2B:
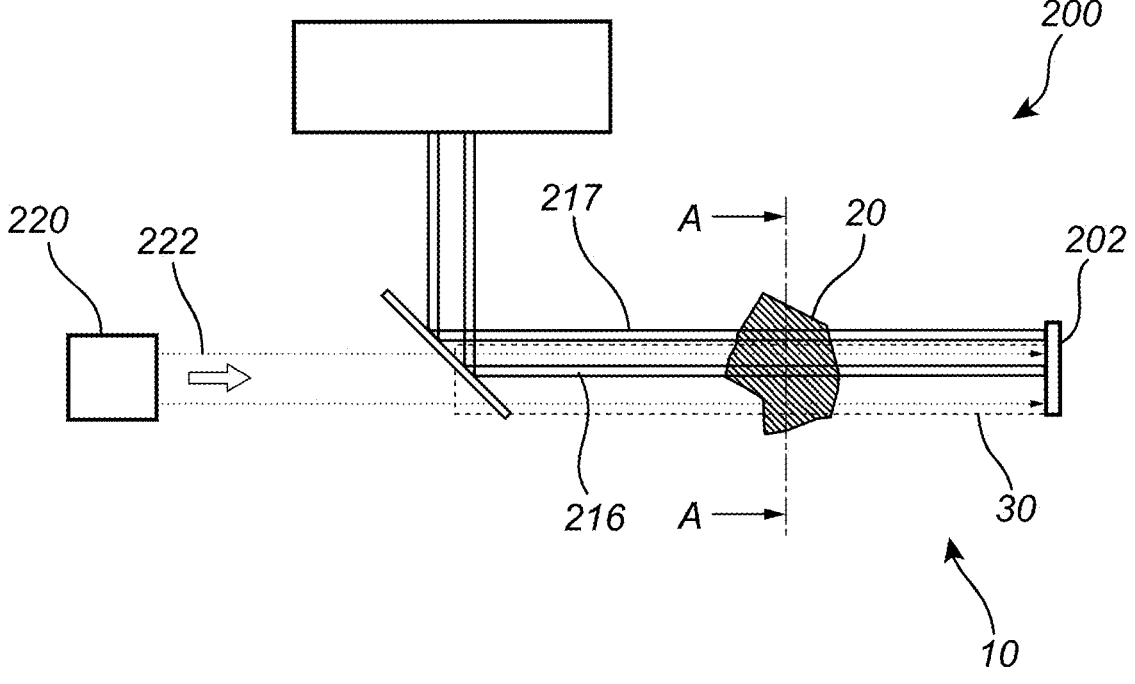
FIG. 2B depicts a schematic setup of the system for open-path sensing of a property of a fluid in an environment according to a second embodiment where a sensing region is larger in comparison to FIG. 2A.

FIG. 2B shows a schematic setup of a system 200 for open-path sensing of a property of a fluid 20 in an environment 10 according to a second embodiment.

The system 200 may share many of the features described above for the first embodiment and for brevity these are not described in detail again. Thus, the system 200 may comprise the sensing light source 110, the first interferometer 130 and the second interferometer 140 as described above. The details are not shown in FIG. 2B for clarity. The first interferometer 130 and the second interferometer 140 in the system 200 use a probing beam 216 similar to the probing beam 116 and a reference beam 217 similar to the reference beam 117. The system 200 shown in FIG. 2B may be set up to use the homodyne detection method shown in FIG. 1A or the heterodyne detection method shown in FIG. 1B.

The system 200 comprises a pumping light source 220 configured to generate and output a pumping beam 222 into the environment 10. The pumping light source 220 is similar to the pumping light source 120 described above. However, in the system 200, the probing beam 216 and the pumping beam 222 are output so as to be parallel in a portion of the environment 10. As shown in FIG. 2B, the system 200 could for instance comprise a dichroic mirror 204 configured to allow the pumping beam 222 to pass unaffected through the dichroic mirror 204 while the probing beam 216 is reflected by the dichroic mirror 204. The probing beam 216 may thus be output by the first interferometer 130 towards the dichroic mirror 204 so as to be reflected by the dichroic mirror 204 into a common path with the pumping beam 222. This implies that a relatively large sensing region 30 is defined in the environment 10. In addition, the reference beam 217 may be reflected by the dichroic mirror 204 so as to follow a path parallel to the path of the pumping beam 222 and the probing beam 216. As illustrated in FIG. 2B, the reference beam 217 may be output so as not to intersect with the pumping beam 222.

The dichroic mirror 204 may be configured to allow the wavelength of the pumping beam 222 to be transmitted through the dichroic mirror 204, while the wavelength of the probing beam 216 and the reference beam 217 are reflected by the dichroic mirror 204.

As indicated in FIGS. 2A and 2B, the probing beam 216 may travel along substantially the same path, as the pumping beam 222. Alternatively, the probing beam 116 may travel along a different path from the pumping beam 122. In particular, the pumping beam 122, 222 and the probing beam 116, 216 should intersect in at least one region.

In the system 100 of FIG. 2A, the probing beam 116 and reference beams 117 are reflected by the reflective surface 102, as also shown in FIGS. 1A and 1B. The reflective surface 102 may in particular ensure that the probing beam 116 and reference beam 117 are reflected back to the interferometers. For instance, the reflective surface 102 may be a retroreflector.

In the system 200 of FIG. 2B, the pumping beam 222 as well as the probing beam 216 and the reference beam 217 may be incident on the reflective surface 202. The probing beam 216 and the reference beam 217 are configured to be reflected by the reflective surface 202 towards the first interferometer 130 and the second interferometer 140, respectively. However, it may be desired that the pumping beam 222 is not reflected by the reflective surface 202. Thus, the reflective surface 202 may be formed by a dichroic mirror 202 which may allow the pumping beam 222 to pass through the dichroic mirror 202, while the probing beam 216 and reference beam 217 are reflected by the dichroic mirror 202.

The probing beam 116 and 216 of the system 100 and 200, respectively, is configured to have been phase shifted and/or experienced an intensity change when propagating through the environment 10 and the sensing region 30, wherein the fluid 20 in the sensing region 30 have changed light propagation characteristics induced by the pumping beam 122 and 222, respectively. Thus, the first interferometer 130 is configured to receive the probing beam 116 or 216 that has been phase shifted and/or experienced an intensity change induced by the effect on the fluid 20 in the sensing region 30.

The reference beam 117 and 217 of the system 100 and 200, respectively, travels along a similar path as the probing beam 116 and 216, respectively. Although it may appear from FIG. 2A that the reference beam 117 intersects with the pumping beam 122, it should be realized that the reference beam 117 need not necessarily do so in the system 100. For instance, the reference beam 117 may be offset from the pumping beam 122 in a direction into or out of the drawing in FIG. 2A. As will be discussed in relation to FIG. 3A-C, the reference beam 117 and 217, respectively, may intersect the pumping beam 122 and 222, respectively, but need not necessarily do SO.

Thus, the second interferometer 140 is configured to receive the reference beam 117 or 217 that has been phase shifted and/or experienced an intensity change by propagating through the environment 10. The reference beam 117 or 217, respectively, travels along a similar path as the probing beam 116 or 216, respectively. However, the reference beam 117 or 217, respectively, has a smaller intersection with the respective pumping beam 122 or 222 than the respective probing beam 116 or 216. In particular, the reference beam 117 or 217 may have no intersection with the pumping beam 122 or 222, respectively.

The probing beam 116 or 216, respectively, and the reference beam 117 or 217, respectively, may, e.g., experience the same background temperature variations such that the change of the effective refractive index of background variations in the environment may cause the same phase change of the probing beam 116 or 216, respectively, and the reference beam 117 or 217, respectively.

Thus, the output from the second interferometer 140 may be used for removing background noise from variations in the environment 10. Further, the output 140 may be used for removing common noise originating from the sensing light source 110 (such as laser phase noise) from measurements performed by the first interferometer 130.

In general, the effective refractive index of a fluid 20 may be detected by measuring a frequency shift caused by the fluid 20 on the probing beam 116 or 216, respectively, and/or the reference beam 117 or 217, respectively. In other words, the effective refractive index of the fluid 20 may be detected by the first interferometer 130 and the second interferometer 140, respectively. The changes of the effective refractive index of the fluid 20 caused by the pumping beam 122 or 222 may be determined by comparison of the output by the first interferometer 130 with the output by the second interferometer 140.

For instance, the changes of the effective refractive index of the fluid 20 may be determined based on Laser Doppler Vibrometry, which may be utilized by both the first interferometer 130 and the second interferometer 140.

The systems 100 and 200 are illustrated in FIGS. 2A and 2B to output one reference beam 117 and 217, respectively. However, as will also be discussed in relation to FIGS. 3A-3C below, it is to be understood that a plurality of reference beams may be output in any of the systems 100 and 200.

Figure 3A:
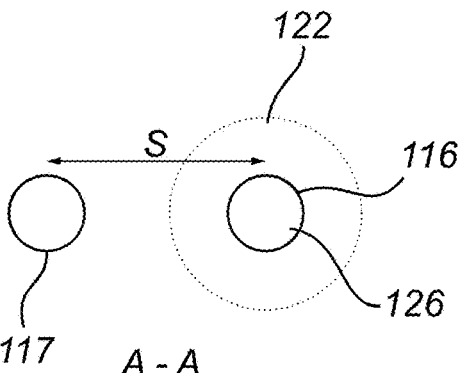
FIG. 3A-C shows schematic cross-sections of sensing regions, which applies to the setup in both FIG. 2A and FIG. 2B.
Figure 3B:
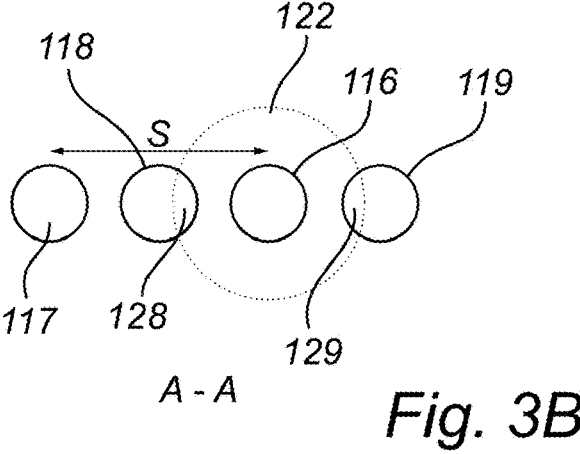
Figure 3C:
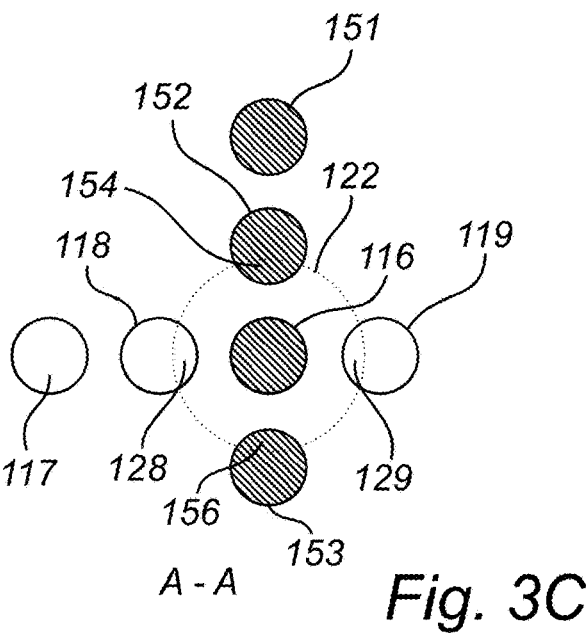

FIGS. 3A, 3B, and 3C all show cross sections of the sensing regions 30. These cross sections may apply to the setup in both the system 100 of FIG. 2A and the system 100 of FIG. 2B. However, for brevity, reference will now merely be made to cross sections of the system 100 of FIG. 2A.

In the cross-sections illustrated in FIGS. 3A-3C, the probing beam 116 and the pumping beam 122 fully intersects, while the reference beam 117 has no intersection with the pumping beam 122. However, it is to be understood that any configuration 5 where a first intersection 126 between the probing beam 116 and the pumping beam 122 is larger than a second intersection 127 between the reference beam 117 and the pumping beam 122, is feasible.

In FIG. 3A, a single reference beam 117 is used. Here, the reference beam 117 is centrically distanced to the probing beam with a distance S. It is to be understood that this cross-section constitutes a mere illustrative example of some characteristic features. In particular, the distance, S, and the cross-sectional diameters of the probing beam 116, reference beam 117, and pumping beam 122 may not be to scale.

The probing beam 116, reference beam 117, and pumping beam 122 are further depicted as circular beams, however, it is to be understood that the cross-sections of the beams may have any shape. One, or more, beams may, e.g. have a square cross-section.

The system 100 uses a separate first interferometer 130 and second interferometer 140 for determining phase shift and/or intensity change experienced by the probing beam 116 and the reference beam 117, respectively. This implies that the system 100 allows for easy scaling such that additional probing beams and/or reference beams may be used, wherein additional interferometers may be used for determining phase shift and/or intensity change for such additional beams.

FIG. 3B shows a cross-section of the sensing region 30 of the system 100 configured to output a second reference beam 118 and a third reference beam 119 into the environment 10. In particular, the system 100 thus comprises a third interferometer and a fourth interferometer (not shown here).

As illustrated in FIG. 3B, the second reference beam 118 and the third reference beam 119 intersects the pumping beam 122 in a sensing region 30 within the environment 10. Specifically, the first intersection 126 between the probing beam 116 and the pumping beam 122 is larger than a third intersection 128 between the second reference 118 beam and the pumping beam 122, and the first intersection 126 is larger than a fourth intersection 129 between the third reference 119 beam and the pumping beam 122.

Similar as to the second interferometer 140 and the reference beam 117 disclosed in relation to FIGS. 1A and 1B, the third interferometer is configured to receive the second reference beam 118 having propagated through the environment 10. The second reference beam 118 is also configured to be phase shifted and/or experience an intensity change by propagating through the environment 10. The third interferometer is also configured to detect a phase shift and/or an intensity change of the received second reference beam 118 based on interference between the received second reference beam 118 and a portion of the reference beam light 114 which has not propagated through the environment 10.

Similarly, the fourth interferometer is configured to receive the third reference beam 119 having propagated through the environment 10. The third reference beam 119 is also configured to be phase shifted and/or experience an intensity change by propagating through the environment 10. In particular, the fourth interferometer is configured to detect a phase shift of the received third reference beam 119 based on interference between the received third reference beam 119 and a portion of the reference beam light 114 which has not propagated through the environment 10.

Since the second reference beam 118 and the third reference beam 119 are configured to intersect with the pumping beam 122 at different spatial locations, differences in the fluid 20 along the intersection may be identified by comparing output from the third and fourth interferometers.

In particular, the second reference beam 118 and the third reference beam 119 may be symmetrically positioned around a center of the pumping beam 122. If there is no difference in characteristics of the fluid within the cross-section of the pumping beam 122, the second and third reference beams 119 should thus detect the same phase shift and/or intensity change. The system 100 may particularly be configured to detect a flow rate of the fluid 20 based on measurements by the third interferometer and the fourth interferometer.

If there is a flow of the fluid 20 along a line defined by the second and third reference beams 118 and 119 in the cross-section of the pumping beam 122, a profile of the change of light propagation characteristics of the fluid 20 caused by the pumping beam 122 may be shifted along a direction of the flow of the fluid 20. Thus, if there is a net flow of fluid 20 from the second reference beam 118 towards the third reference beam 119, the change of light propagation characteristics may be more prominent in the propagation of the third reference beam 119. This differing effect on the fluid 20 may be determined based on measurements by the third interferometer and the fourth interferometer. In other words, a flow rate of the fluid 20 may be determined based on differing effects on the fluid 20 within the cross-section of the pumping beam 122 as sensed by the second reference beam 118 and the third reference beam 119.

Consequently, if a flow rate of the fluid 20 is present, a distribution of change of the refractive index due to the pumping beam 122 may be present, and the second reference beam 118 and third reference beam 119 may be affected to different extent by the change in refractive index of the fluid 20 caused by the pumping beam 122, due to the different positions of the third 128 and fourth intersection 129 with the pumping beam 122. Thus a phase and/or intensity difference between the second reference beam 118 and the third reference beam 119 may be used to derive the flow rate of the fluid 20.

As explained above, the system 100 is here configured to output the second reference beam 118 and the third reference beam 119 symmetrically positioned around a center of the pumping beam 122 and the probing beam 116. However, the second reference beam 118 and the third reference beam 119 may be positioned in any suitable manner. Moreover, all reference beams 117, 118, 119 are here seen to be aligned with each other, however, it is to be understood that the reference beams 117, 118, 119 may not necessarily be in alignment with each other.

The set-up in FIG. 3B may be used for determining flow of fluid along one direction. In FIG. 3C, a set-up is illustrated, which may be used for determining flow of fluid in two dimensions within the illustrated cross-section.

In FIG. 3C, further reference beams are shown along a line perpendicular to the line defined by reference beams 117, 118, 119. Thus, in FIG. 3C, additional reference beams 151, 152, 153 are illustrated. Each of these additional reference beams 151, 152, 153 may be associated with a respective interferometer for detecting a phase shift and/or intensity change of the reference beams having propagated through the fluid 20.

The additional reference beams 151, 152, 153 are configured such that the reference beam 151 has no intersection with the pumping beam 122, whereas the reference beams 152, 153 are arranged symmetrically around the center of the pumping beam 122 with an intersection 154 and 156, respectively, with the pumping beam 122, wherein the intersections 154 and 156 are equally large but smaller than the first intersection 126 between the probing beam 116 and the pumping beam 122.

Similar to the set-up in FIG. 3B, the set-up in FIG. 3C may be configured to detect a flow of fluid along the line defined by the reference beams 151, 152, 153. This may be used for determining a flow rate of the fluid in two dimensions.

FIG. 4 shows a system 300 for open-path sensing of a property of a fluid 20 in an environment 10, wherein two pumping beams are used.

In particular, the system 300 may be configured according to the embodiment described above in relation to FIG. 2A. The system 300 may thus be configured to output a probing beam 316 and at least one reference beam (not shown here) with an angle in relation to a pumping beam 322. The system 300 may further comprise a first and a second interferometer. The probing beams and the reference beams may be generated as described above and each beam may be associated with a separate interferometer as discussed above. These details will not be further explained here for the system 300.

The system 300 is configured to use light generated by the pumping light source 320 to output a pumping beam 322 and an additional pumping beam 324, wherein the additional pumping beam 324 is also configured to induce a change of light propagation characteristics of the fluid 20. The system 300 may comprise a beam splitter to split light formed by the pumping light source 320 into the pumping beam 322 and the additional pumping beam 324. The additional pumping beam 324 may be guided onto a mirror which may divert the additional pumping beam 324 into the environment 10. This implies that an angle between the direction of propagation of the additional pumping beam 324 and the pumping beam 322 may be controlled. In particular, the pumping beam 322 and the additional pumping beam 324 may intersect in at least one region of interest in the environment 10.

Figures 4A, 4B:
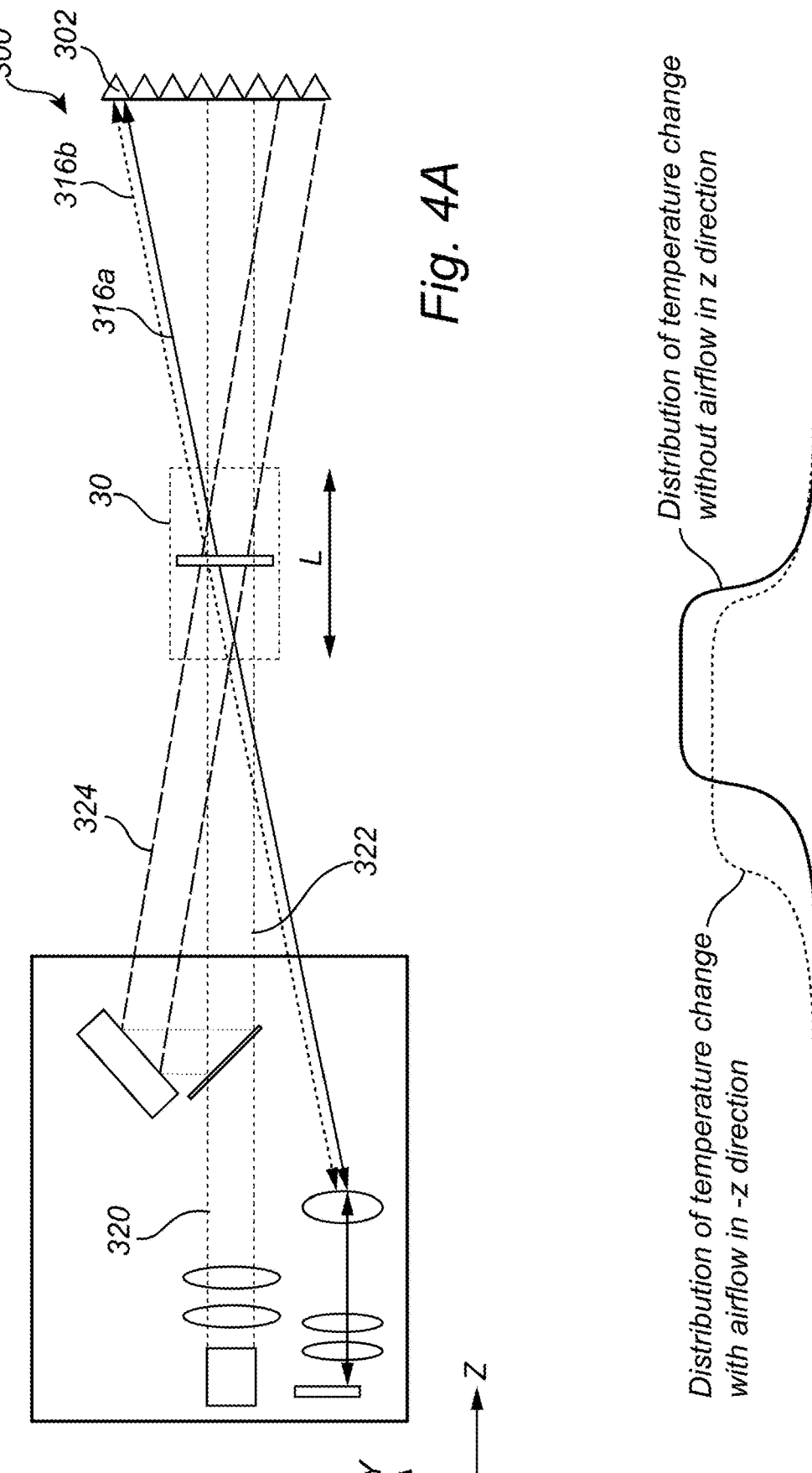
FIG. 4A depicts a schematic setup of a system for open-path sensing of a property of a fluid in an environment according to a third embodiment, wherein two pumping beams are used.
FIG. 4B depicts a schematic distribution of a property of a fluid as affected by fluid flow.

The system 300 is further configured to output a plurality of probing beams, illustrated in FIG. 4A as probing beams 316a, 316b. As illustrated in FIG. 4A, the probing beams 316a, 316b may be output in parallel such as to intersect the region of interest defined by the intersection of the pumping beam 322 and the additional pumping beam 324 at different positions along a direction of propagation of light of the pumping beam 322.

Whereas the set-up in FIGS. 3B-3C illustrate how a distribution of characteristics of the fluid within a cross-section of the pumping beam 122 may be detected, the set-up in FIG. 4A may be used for detecting a distribution of characteristics of along the direction of propagation of the pumping beam 322, i.e., in a third dimension.

As shown in FIG. 4A, the pumping light source 320 is used to generate the pumping beam 322 and the additional pumping beam 324, however, the pumping beam 322 and the additional pumping beam 324 may be generated from separate pumping light sources.

Furthermore, the reflective surface 302 is in FIG. 4A specifically a retroreflector such that each beam is reflected back in the direction it originated from. However, it is appreciated that the reflective surface 302 may not necessarily be a retroreflector, for example, the reflective surface 302 may be a plurality of reflective surfaces or reflectors such that each beam is reflected back in the direction it originated from.

In FIG. 4B, distribution of a temperature change, and hence change of refractive index caused in the region of interest by the pumping beam 322 and the additional pumping beam 324 is illustrated. It should be realized that the pumping beam 322 and the additional pumping beam 324 only intersect within the region of interest such that the effect of light propagation characteristics outside the region of interest may be much smaller, since fluid is only affected by one individual pumping beam outside the region of interest.

The distribution of temperature change along the direction of propagation of the pumping beam 322 may be confined to the region of interest if no fluid flow along the direction of propagation of the pumping beam 322 is present. However, as illustrated in FIG. 4B, for instance if there is a flow of fluid towards the pumping light source 320, the distribution of the temperature change may be affected, which may also be detected by the probing beams 316a, 316b being configured to intersect with the pumping beam 322 at different positions along the direction of propagation of the pumping beam 322.

Figure 5:
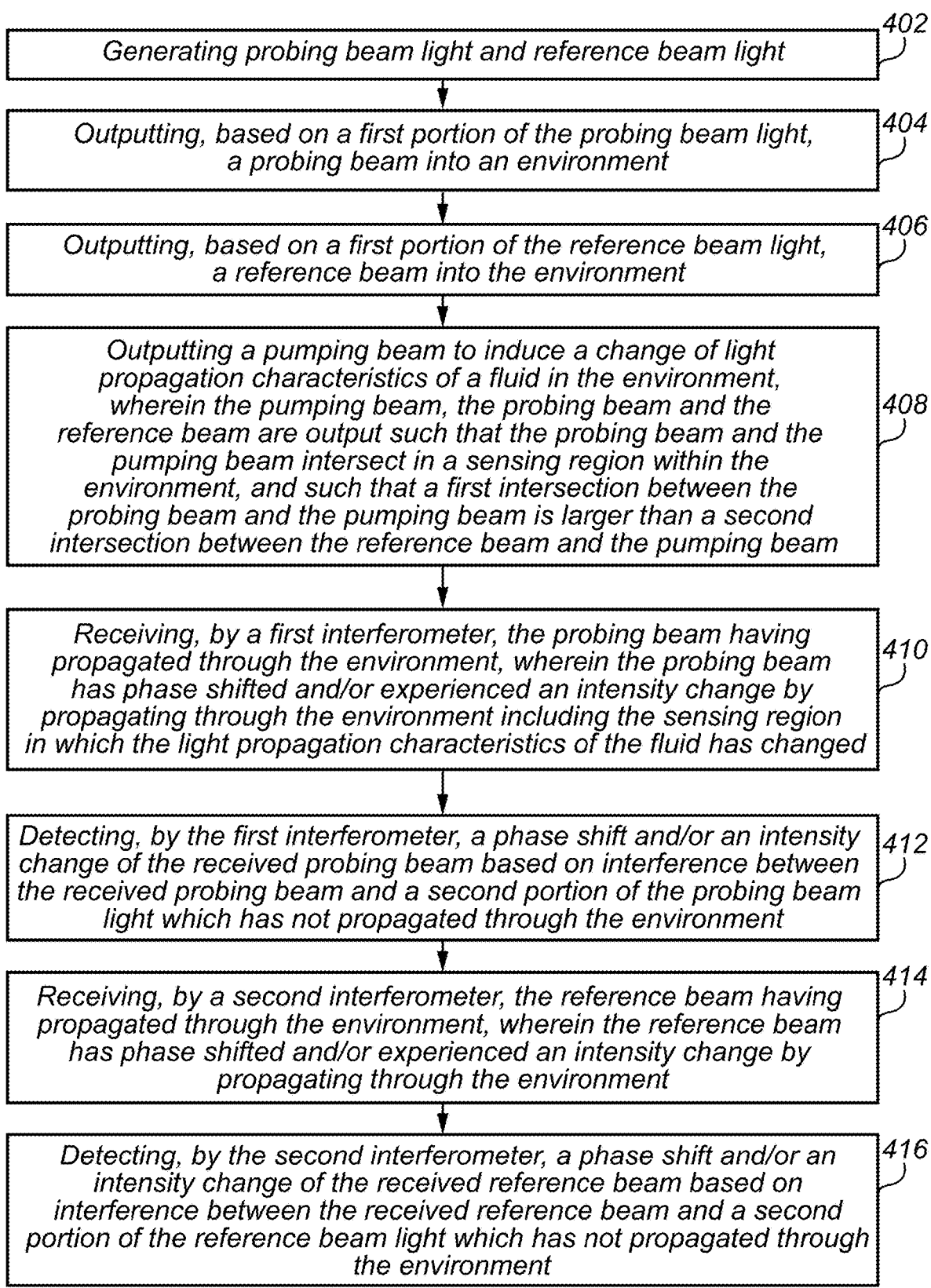
FIG. 5 shows a block diagram of a method for open-path sensing.

Referring now to FIG. 5, method for open-path sensing of a property of a fluid in an environment will be briefly summarized. The method may be provided by any of the systems 100, 200, 300 described above.

In particular, the method comprises: generating 402, by at least one sensing light source, probing beam light and reference beam light.

The method further comprises outputting 404, based on a first portion of the probing beam light, a probing beam into the environment and outputting 406, based on a first portion of the reference beam light, a reference beam into the environment.

The method further comprises outputting 408 a pumping beam to induce a change of light propagation characteristics of the fluid, wherein the pumping beam, the probing beam and the reference beam are output such that the probing beam and the pumping beam intersect in a sensing region within the environment, and such that a first intersection between the probing beam and the pumping beam is larger than a second intersection between the reference beam and the pumping beam.

The method further comprises receiving 410, by a first interferometer, the probing beam having propagated through the environment, wherein the probing beam has phase shifted and/or experienced an intensity change by propagating through the environment including the sensing region in which the light propagation characteristics of the fluid 20 has changed.

The method further comprises detecting 412, by the first interferometer, a phase shift and/or an intensity change of the received probing beam based on interference between the received probing beam and a second portion of the probing beam light which has not propagated through the environment.

The method further comprises receiving 414, by a second interferometer, the reference beam having propagated through the environment, wherein the reference beam has phase shifted and/or experienced an intensity change by propagating through the environment.

The method further comprises detecting 416, by the second interferometer, a phase shift and/or an intensity change of the received reference beam based on interference between the received reference beam and a second portion of the reference beam light which has not propagated through the environment.

In the above, the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A system for open-path sensing of a property of a fluid in an environment, the system comprising:

at least one sensing light source configured to generate probing beam light and reference beam light;

a pumping light source configured to generate and output a pumping beam into the environment, wherein the pumping beam is configured to induce a change of light propagation characteristics of the fluid;

a first interferometer;

a second interferometer;

a third interferometer; and a fourth interferometer, wherein the system is configured to output a probing beam into the environment based on a first portion of the probing beam light, to output a reference beam into the environment based on a first portion of the reference beam light, and to output the pumping beam, such that the probing beam and the pumping beam intersect in a sensing region within the environment, and such that a first intersection between the probing beam and the pumping beam is larger than a second intersection between the reference beam and the pumping beam, wherein the first interferometer is configured to receive the probing beam having propagated through the environment, wherein the probing beam is configured to be phase shifted and/or experience an intensity change by propagating through the environment including the sensing region having changed light propagation characteristics induced by the pumping beam, wherein the first interferometer is further configured to detect a phase shift and/or an intensity change of the received probing beam based on interference between the received probing beam and a second portion of the probing beam light which has not propagated through the environment, wherein the second interferometer is configured to receive the reference beam having propagated through the environment, wherein the reference beam is configured to be phase shifted and/or experience an intensity change by propagating through the environment, wherein the second interferometer is further configured to detect a phase shift and/or an intensity change of the received reference beam based on interference between the received reference beam and a second portion of the reference beam light which has not propagated through the environment, wherein the system is further configured to output a second reference beam and a third reference beam into the environment, such that the second reference beam and the third reference beam intersects the pumping beam in a sensing region within the environment, and such that the first intersection between the probing beam and the pumping beam is larger than a third intersection between the second reference beam and the pumping beam, and such that the first intersection is larger than a fourth intersection between the third reference beam and the pumping beam, wherein the third interferometer is configured to receive the second reference beam having propagated through the environment, wherein the second reference beam is configured to be phase shifted and/or experience an intensity change by propagating through the environment, wherein the third interferometer is further configured to detect a phase shift and/or an intensity change of the received second reference beam based on interference between the received second reference beam and a portion of the reference beam light which has not propagated through the environment, and wherein the fourth interferometer is configured to receive the third reference beam having propagated through the environment, wherein the third reference beam is configured to be phase shifted and/or experience an intensity change by propagating through the environment, wherein the fourth interferometer is further configured to detect a phase shift of the received third reference beam based on interference between the received third reference beam and a portion of the reference beam light which has not propagated through the environment.

2. The system according to claim 1, wherein the second interferometer is configured to determine information allowing reduction of common noise and background of the environment of information acquired by the first interferometer.

3. The system according to claim 1, wherein the pumping beam is a modulated pumping beam.

4. The system according to claim 1, wherein the at least one sensing light source is a single sensing light source configured to generate light forming both the probing beam light and the reference beam light.

5. The system according to claim 1, wherein the pumping beam is configured to have a wavelength corresponding to an absorption wavelength of a substance of interest in the environment.

6. The system according to claim 1, wherein the change of light propagation characteristics of the fluid comprises a change of an effective refractive index of the fluid.

7. The system according to claim 6, wherein the effective refractive index is detected by the first interferometer and the second interferometer, respectively, based on Laser Doppler Vibrometry.

8. The system according to claim 1, wherein the environment is an open space.

9. The system according to claim 1, wherein an angle between a main propagation direction of the probing beam and a main propagation direction of the pumping beam is smaller than 30°, such as smaller than 10°.

10. The system according to claim 1, wherein the system further comprises a reflective surface configured to reflect the probing beam such that the probing beam having propagated through the environment is reflected back through the environment to be received by the first interferometer, and to reflect the reference beam such that the reference beam having propagated through the environment is reflected back through the environment to be received by the second interferometer.

11. The system according to claim 1, wherein the system is configured to output the second reference beam and the third reference beam symmetrically positioned around a center of the pumping beam.

12. The system according to claim 1, wherein the system is configured to detect a flow rate of the fluid based on measurements by the third interferometer and the fourth interferometer.

13. The system according to claim 1, wherein the system is configured to output an additional pumping beam, wherein the additional pumping beam is configured to induce a change of light propagation characteristics of the fluid, and wherein the pumping beam and the additional pumping beam are configured to propagate at an angle to each other and to intersect in at least one region of interest in the environment.

14. A method for open-path sensing of a property of a fluid in an environment, the method comprising:

generating, by at least one sensing light source, probing beam light and reference beam light;

outputting, based on a first portion of the probing beam light, a probing beam into the environment;

outputting, based on a first portion of the reference beam light, a reference beam into the environment;

outputting a pumping beam to induce a change of light propagation characteristics of the fluid, wherein the pumping beam, the probing beam and the reference beam are output such that the probing beam and the pumping beam intersect in a sensing region within the environment, and such that a first intersection between the probing beam and the pumping beam is larger than a second intersection between the reference beam and the pumping beam;

receiving, by a first interferometer, the probing beam having propagated through the environment, wherein the probing beam has phase shifted and/or experienced an intensity change by propagating through the environment including the sensing region in which the light propagation characteristics of the fluid has changed;

detecting, by the first interferometer, a phase shift and/or an intensity change of the received probing beam based on interference between the received probing beam and a second portion of the probing beam light which has not propagated through the environment;

receiving, by a second interferometer, the reference beam having propagated through the environment, wherein the reference beam has phase shifted and/or experienced an intensity change by propagating through the environment;

detecting, by the second interferometer, a phase shift and/or an intensity change of the received reference beam based on interference between the received reference beam and a second portion of the reference beam light which has not propagated through the environment;

outputting a second reference beam and a third reference beam into the environment, such that the second reference beam and the third reference beam intersects the pumping beam in a sensing region within the environment, and such that the first intersection between the probing beam and the pumping beam is larger than a third intersection between the second reference beam and the pumping beam, and such that the first intersection is larger than a fourth intersection between the third reference beam and the pumping beam;

receiving, by a third interferometer, the second reference beam having propagated through the environment, wherein the second reference beam has phase shifted and/or experienced an intensity change by propagating through the environment, wherein the third interferometer further detects a phase shift and/or an intensity change of the received second reference beam based on interference between the received second reference beam and a portion of the reference beam light which has not propagated through the environment; and receiving, by a fourth interferometer, the third reference beam having propagated through the environment, wherein the third reference beam has phase shifted and/or experienced an intensity change by propagating through the environment, wherein the fourth interferometer further detects a phase shift of the received third reference beam based on interference between the received third reference beam and a portion of the reference beam light which has not propagated through the environment.

* * * * *